April 29, 1952  H. W. PROTZELLER  2,594,990
CRIBBER CHAIN
Filed Sept. 16, 1946  6 Sheets-Sheet 2

Fig. 2

Inventor
Harry W. Protzeller
by Parker Carter
Attorneys.

April 29, 1952 H. W. PROTZELLER 2,594,990
CRIBBER CHAIN
Filed Sept. 16, 1946 6 Sheets-Sheet 4

Inventor
Harry W. Protzeller
by Parker & Carter
Attorneys.

April 29, 1952  H. W. PROTZELLER  2,594,990
CRIBBER CHAIN
Filed Sept. 16, 1946  6 Sheets-Sheet 5

Fig. 7

Inventor
Harry W. Protzeller
by Parker & Carter
Attorneys

April 29, 1952 — H. W. PROTZELLER — 2,594,990
CRIBBER CHAIN
Filed Sept. 16, 1946 — 6 Sheets-Sheet 6

Inventor
Harry W. Protzeller
by Parker & Carter
Attorneys

Patented Apr. 29, 1952

2,594,990

UNITED STATES PATENT OFFICE 2,594,990

CRIBBER CHAIN

Harry W. Protzeller, Milwaukee, Wis., assignor to Nordberg Manufacturing Company, Milwaukee, Wis., a corporation of Wisconsin Application September 16, 1946, Serial No. 697,308

5 Claims. (Cl. 37—191)

My invention relates to an improvement in a chain and has for one purpose to provide an improved excavating chain.

Another purpose is to provide a double chain structure, in which two chains are connected by transversely extending flights.

Another purpose is to provide a chain in which transversely extending flights have portions acting as links in the chain.

Another purpose is to provide a double chain structure, in which two chains are connected by transversely extending flights, and in which said flights have parts which form links in both chains.

Another purpose is to provide an improved form of chain link.

Another purpose is to provide a multiple chain structure, having a roller chain component and a pintle connected link component in parallel therewith, and directly connected thereto.

Another purpose is to provide a chain and link having maximum wear-resisting properties.

Another purpose is to provide a link form which is adapted for substantially uniform wear.

Another purpose is to provide an improved chain and guide structure, in which the chain is guided about a reverse curve.

Other purposes will appear from time to time in the course of the specification and claims.

I illustrate the invention more or less diagrammatically in the accompanying drawings wherein.

Like parts are indicated by like symbols throughout the specification and drawings.

Figures 1, 8, 9:
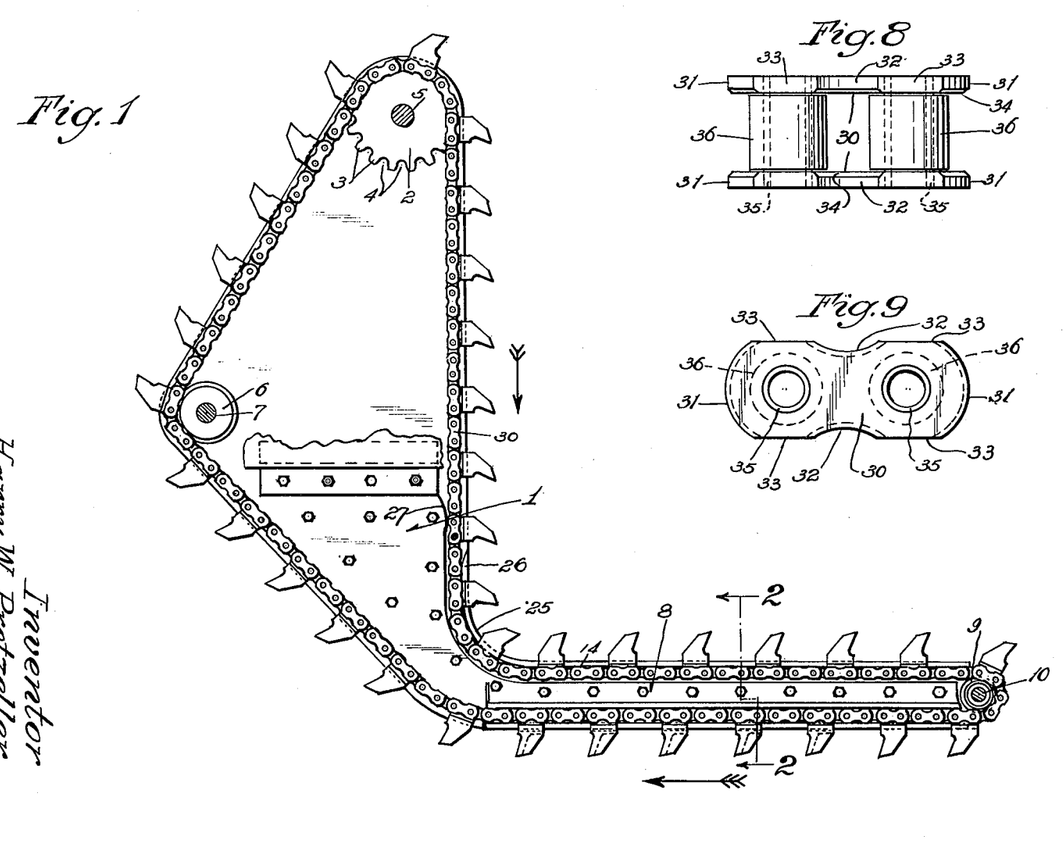
Figure 1 is a side elevation, with parts broken away and parts in section, illustrating my chain and guide assembly.
Figure 8 is a plan view of a roller chain link assembly.
Figure 9 is a side elevation of the structure of Figure 8.
Figure 6:
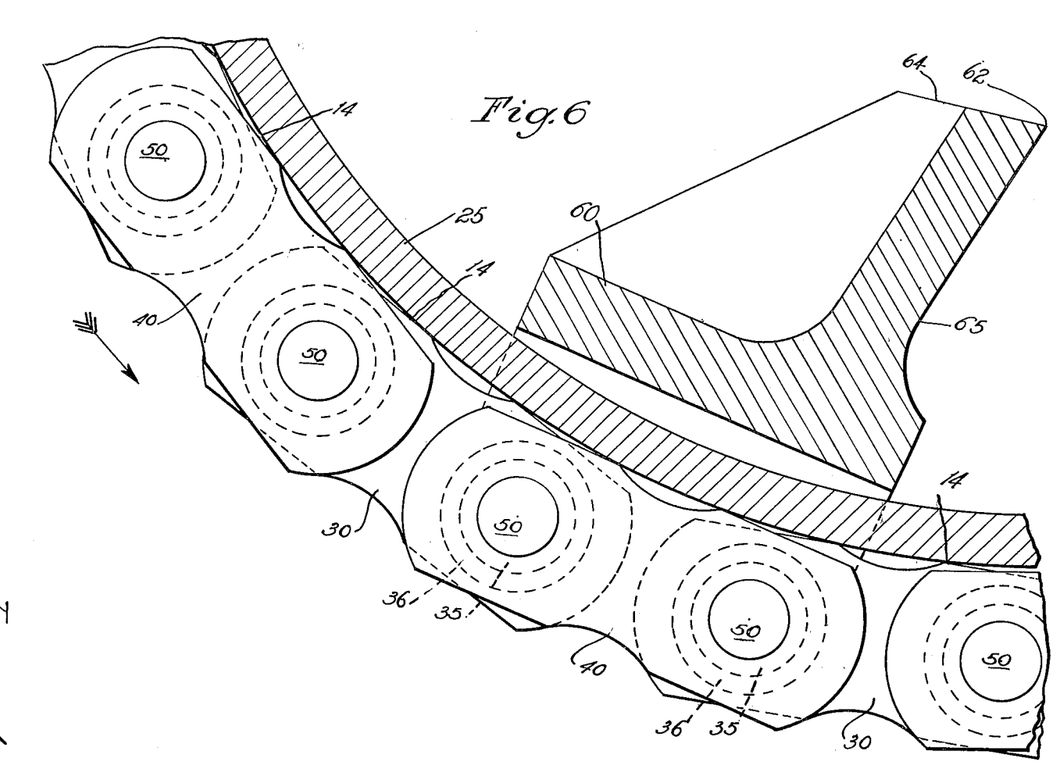
Figure 6 is a side elevation, with parts in section, on an enlarged scale, illustrating the passage of the chain about the reverse curve guide portion.

Referring to the drawings, and first to Figure 1, I generally indicates a boom structure, the details of which do not form part of the present invention. It is illustrated as carrying a drive sprocket 2, having teeth 3, separated by spaces 4, adapted to receive the below described rollers of the chain. 5 is any suitable shaft for the sprocket 2. 6 illustrates any suitable idler or guide sprocket, with its shaft 7. 8 generally indicates a nose portion carrying, at its outer end, a guide sprocket 9, with its shaft 10. Whereas the details of the guide may be widely varied, I find it advantageous to employ a guide having chain engaging flanges. Considering, for example, Figure 2, which illustrates a section of the nose portion 8 of the guide structure, 11 is a longitudinal member along which are positioned channels 12 and 13, the channels having upper flanges 14 and lower flanges 15. Secured to the outer faces of the webs of the channels 12 and 13 are longitudinally extending brackets or angles 16, having outwardly extending flanges 17, and reinforcing webs 18. The structure may be held together, for example, by bolts 19, headed as at 20, and provided with nuts 21 and washers 22. The upper flanges 14 may be extended by curved guide flanges 25, to define the reverse curve guide portion, shown, for example, in Figure 6. These flanges 25 may terminate as at 26 in inclined portions which, in effect, cam the chain links into proper position to enter the excavating part of the chain excursion. The corresponding camming portion 27 may form part of the general boom structure, to prevent undue recession of the chain from the desired path of movement, as shown by the arrow of Figure 1.

Figures 3, 4, 5:
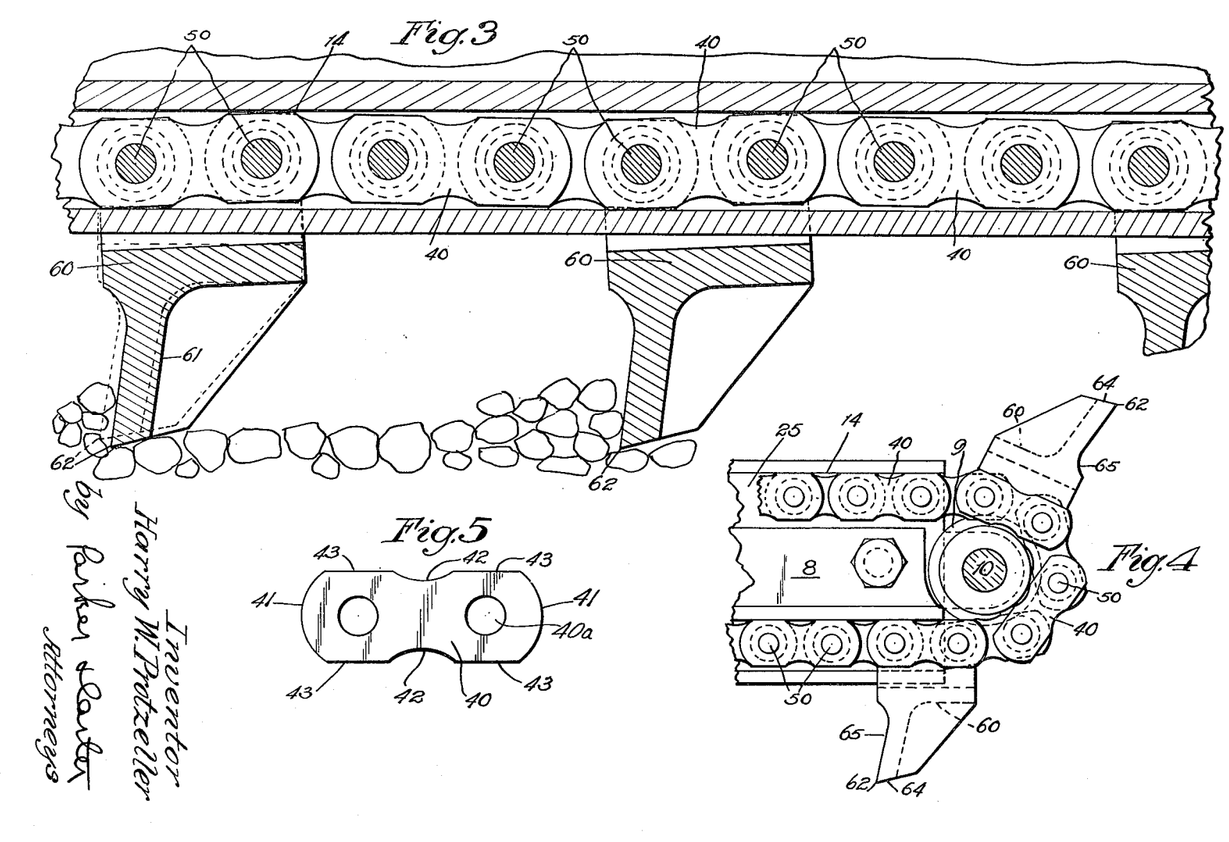
Figure 3 is a section on the line 3—3 of Figure 2.
Figure 4 is a partial side elevation, on an enlarged scale of the structure shown in Figure 1.
Figure 5 illustrates a link part.

The chain proper includes a plurality of basic link elements, each of which includes a plurality of side members 30. As shown in Figure 9, each side member has a convex rounded portion 31 at each end. It has intermediate concave rounded portions 32. It is shown as having four general rectilinear faces or edges 33, which lie in two parallel planes defining opposite parallel edges of the members 30. If desired, the members 30 may be inwardly beveled as at 34, but this is not essential. Two of the members 30 are connected by tubular sleeves 35, the ends of which may be upset in corresponding relationship with the side members 30. About each of the tubular connections 35 is a roller 36, as shown in Figure 8, and in dotted line in Figure 9. Connecting the roller units thus formed are a plurality of additional flat link members 40, which are of substantially the same form as the link side members 30, but have smaller apertures 40a, since they are not associated directly with sleeves 35. As will be shown in Figure 5, each member 40 has a convex rounded end portion 41 at each end. It also has concave intermediate rounded portions 42 and the plane edge portions 43 at top and bottom. The chain is assembled by passing any suitable pintles or pins 50 through the bores of the sleeves or connecting members 35. These pintles are of substantially greater length than the length of the sleeves 35. As is shown, for example, in Figure 7, each pintle 50 is of sufficient length to receive, at each side of the basic roller unit of Figure 9, a plurality of the flat link members 40. Whereas the chain elements may be arranged in a variety of ways, I illustrate in Figure 7, a double chain structure, the chain components being indicated, for convenience, as A and B. At the outer side of each of these chain components, the roller link units are connected by pairs of link members 40. On the inner side of each chain, in addition to pairs of the links 40 which abut against the outer faces of the roller side link elements 30, are additional flat link elements. Pairs of the elements 40 are arranged, as at C, in parallelism with each roller link unit. Finally, I also provide, at the inner side of each of the chain components, single link members D. As will be clear from Figure 7, there is thus provided a chain structure including two laterally spaced chains. Each of the laterally spaced chains has roller link components, and other components which directly receive the pintles 50. The pintles may be upset at the ends, as at 50a, to hold the links assembled.

Figures 10, 11:
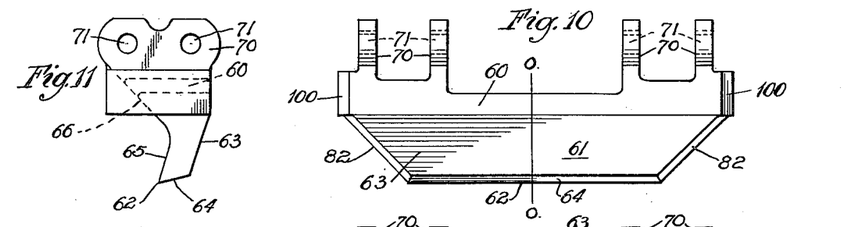
Figure 10 is a front elevation of a shovel flight.
Figure 11 is an end elevation of the structure of Figure 10.
Figure 12:
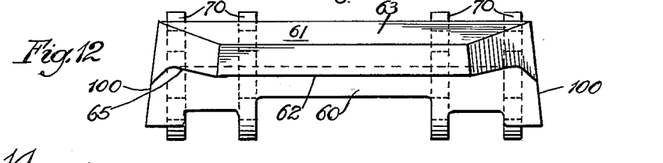
Figure 12 is a bottom view of the structure of Figure 10.

The two chain components A and B are connected transversely by a plurality of flights generally indicated as E. The various flights employed are shown in Figures 10 to 16, inclusive. Each such flight includes a transversely extending body 60, from one face of which projects any suitable digging or excavating element. In the form of Figure 10, I illustrate a single shovel 61, having a sharp forward cutting edge 62, and a somewhat steeper rear face 63. The bottom face of the shovel is upwardly and rearwardly inclined, as at 64. The digging face 65 joins the inclined forward face 66 of the flight body 60. Extending from the opposite face of the flight body 60, I illustrate pairs of lugs 70. The lugs are separated by a space proper to receive one of the roller link units. The lugs are formed generally like the side link members 30 or 40, as will be clear from Figures 11 and 14. Thus the lugs 70 are formed to act as integral parts of the chain structure, and, when flights are inserted in the chain, to take the place of pairs of the side link members 40. Preferably the width of the lugs, transversely of the chain, is twice that of the members 40. The lugs 70 are provided with apertures 71, through which the pintles 50 may pass.

Figure 13:
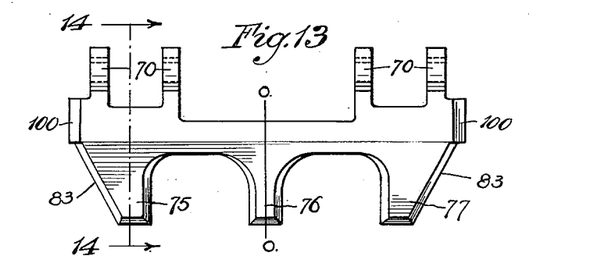
Figure 13 is a front elevation of a flight having a plurality of excavating picks.
Figure 14:
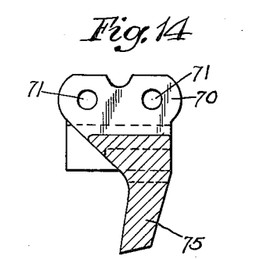
Figure 14 is a section on the line 14—14 of Figure 13.
Figure 15:
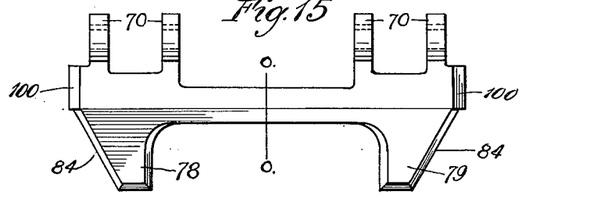
Figure 15 is a front elevation of another flight, having a different arrangement of picks.
Figures 16, 17:
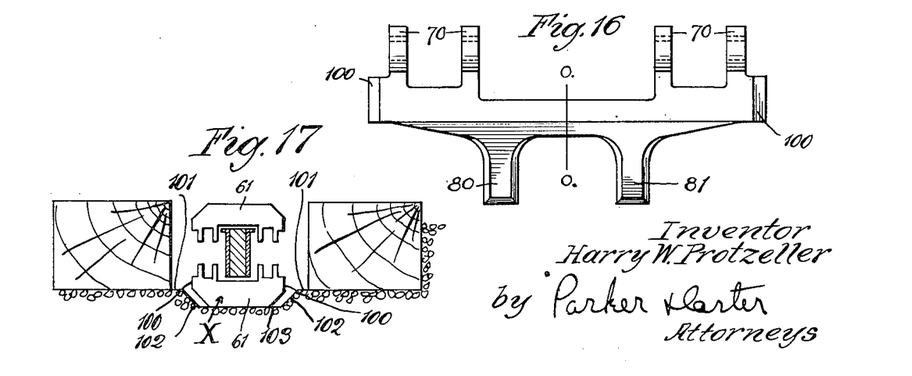
Figure 16 is a similar view of a flight, having a still different arrangement of picks.
Figure 17 is a diagram, illustrating the actual cribbing operation and the contour of the cut or excavation made by the excavating elements described herein.

When my chain is employed for excavation, it may be advantageous to provide a plurality of flights having different digging elements. For example, in Figure 13, I employ a plurality of picks 75, 76, 77, the pick 76 being on the center line of the entire chain structure, while the picks 75 and 77 are each aligned with one of the chain components A or B. In Figure 15, I employ two widely spaced picks 78, 79, each of which is generally aligned with one of the chain components. In Figure 16, I also illustrate two picks 80, 81, somewhat out of line with the chain components. In all forms the picks, or the shovel 61, are symmetrically arranged in relation to the center line of the entire chain structure, this center line being indicated at O in Figures 10, 13, 15 and 16. Also, it is preferable that all of the pick members be forwardly inclined, as is shown in Figure 14, and conform generally to the contour above described in connection with the shovel element 61. It is advantageous that the outer edge portions be beveled or downwardly and inwardly inclined, as at 82 in Figure 10, 83 in Figure 13 and 84 in Figure 15. Since the members 80 and 81 of Figure 16 are located substantially inwardly from the sides of the cut or excavation made by the chain, they need not be thus formed.

It is advantageous to arrange the flights uniformly along the chain, as shown in Figure 1, with the various types of excavator tool arranged in any desired order and relationship. This may depend upon the nature of the material being excavated. Soft material might require only shovel members 61. Hard material might require more of the picks, as shown in Figures 13, 15 and 16.

The two chain components A and B are thus spaced apart and maintained in substantially fixed spaced relationship. The symmetrical arrangement of the excavating tools prevents any substantial side stress or twisting of the chain. The sequence of different types of picks and shovels insures that even the hardest soil will be broken up, and will be conveyed out of the excavation in the course of the normal movement of the chain.

In considering the guiding means employed, it will be understood that the chain, in the particular form of boom herein shown, may be guided about a reverse curve, as by the angles or flanges 25. The actual excavation is done at the time that the flights pass around the pulley 9, and along the bottom of the boom nose portion 8. Thus, at each pass of an individual link about the chain circuit, both edges of the link side members 30 and 40 are subjected to wear.

In moving toward the zone of excavation, one side or edge bears against the guide flanges 25 and its continuation, the flanges 14. However, along the lower side of the nose 8, and during the actual digging excursion, the opposite edges of the link side members are subjected to wear against the lower faces of the flanges 17. This successive wear on opposite sides of the link side members will be clear from an inspection of Figure 2. In fact, in the use of the chain, the wear tends to equalize, with a minimum of deformation of the link members.

As the chain passes around the reverse curve guides 25, prior to entering contact with the top guide flanges 14 of the boom nose 8, the inner lateral enlargements of the two side chains underlie the guides 25, and later the guide flanges 14. There is a minimum of distortion of the chain, by this localized contact, because the pintles run through and are aligned by the lugs 70 of the excavating flights. The length of projection of the pintle beneath the guide flanges 25 or 14 is limited in relation to the entire length of the pintle, as will be clear from the upper part of Figure 2.

It will be realized that whereas I have described and shown a practical and operative device, nevertheless many changes in size, shape, number and disposition of parts may be made without departing from the spirit and content of my invention. I therefore wish my description and drawings to be taken as in a broad sense illustrative or diagrammatic, rather than as limiting me to my specific showing herein.

The use and operation of the invention are as follows:

I provide a chain assembly, of maximum strength and ruggedness, ideally adapted for use in excavating machines. However, it will be realized that I do not wish to limit myself to any particular use of my chain. It is illustrated herein, as a matter of example, to the boom of an excavating machine or cribber, for excavating ballast from between the ties of a track. The mechanism for supporting the boom does not of itself form part of the present invention, and is not shown herein.

Figure 2:
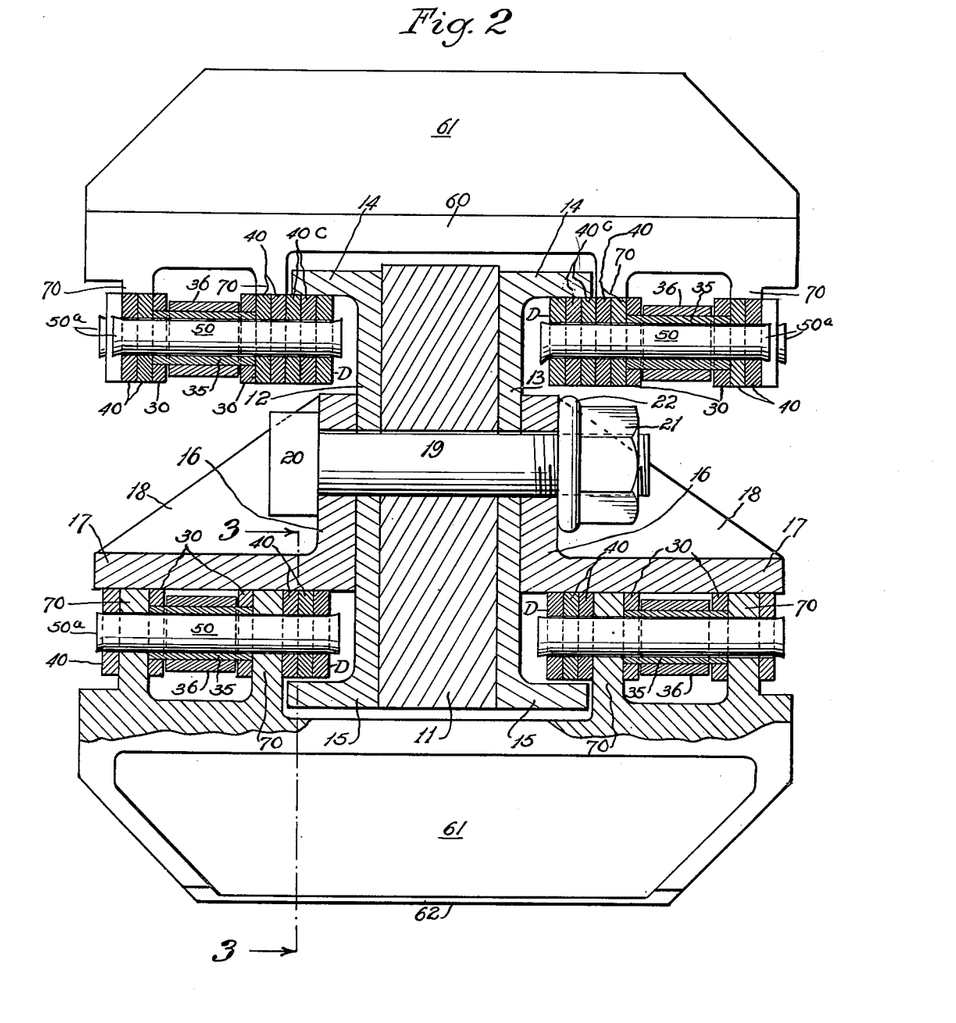
Figure 2 is a section on an enlarged scale on the line 2—2 of Figure 1.

Assuming that power from any suitable source is applied to the drive sprocket 2, or its shaft 5, the chain is moved in the direction of the arrows of Figure 1. The chain passes about the reverse curve guides 25, and along the top guide flanges 14. The two chain components, as shown in Figure 2, are located at opposite sides of the boom structure or frame. Each of the chain components has an inward extension formed by staggered pairs or units of the side link members 40. The inner three, namely, those that are arranged in pairs and the staggered inner singles, overlap and are adapted to engage the inner or lower faces of the guides 25 and 14. On the actual excavating structure, the entire chain structure, including the lugs 70 of the excavating flights, may engage the lower faces of the flanges 17.

Figure 7:
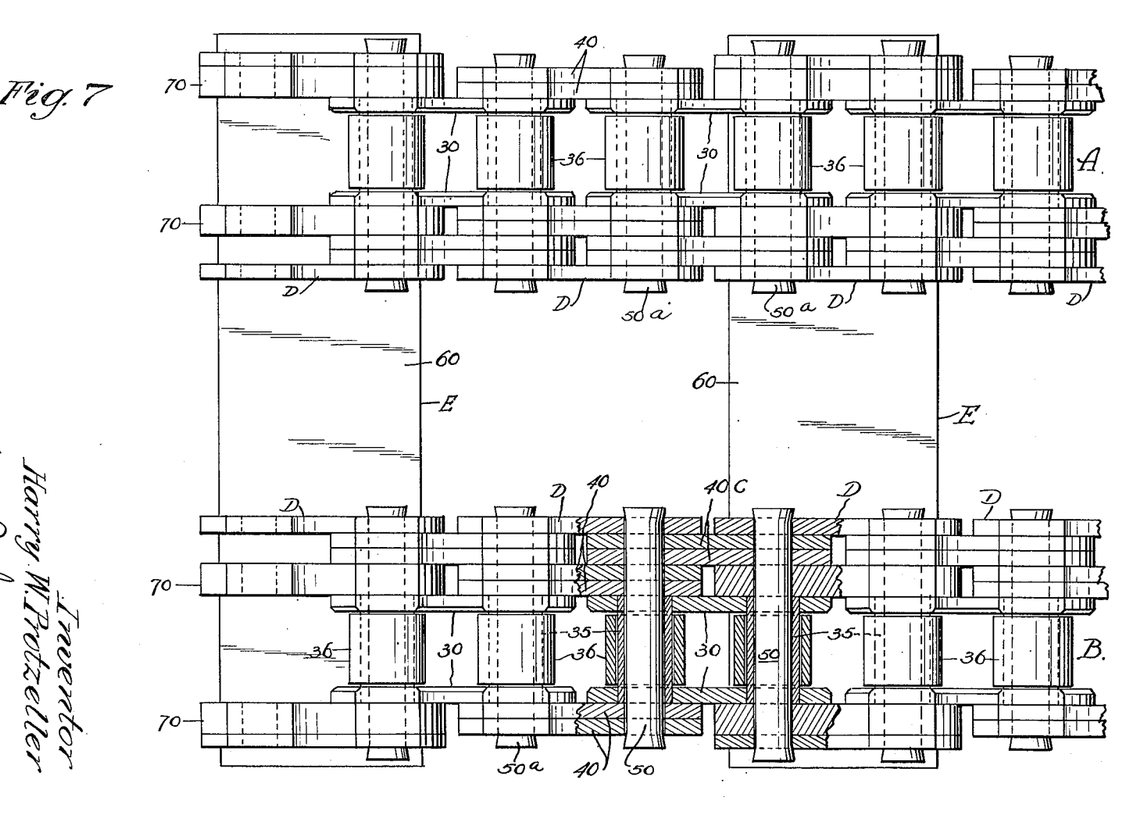
Figure 7 is a plan view, on an enlarged scale, of a length of chain, with parts in section.

I find it advantageous to employ roller link components, which interpenetrate with the drive sprocket 2, but are out of contact with the guiding flanges. In effect, I arrange, in parallel, and in connected relation, a roller chain and a direct pintle connected chain. The two units or components of each chain are tied together by the individual pintles 50, as is clear from Figure 7. Each component of the double chain structure shown in Figure 7 has its roller link elements on the outer side, and its nonroller elements on the inner side. The two chains thus formed are spaced and connected by a closely spaced series of conveyor flights. As shown in Figures 10 to 16, these flights may be of different contours, depending on the particular work to be done. I find it advantageous to space the flights closely along the chain, as shown in Figures 1 and 7. I find it advantageous to arrange the excavating projections in a balanced or symmetrical arrangement at opposite sides of the center line of the entire chain element. As shown, for example, in Figures 10 to 16, the shovel 61 is centered on the line O. In the form of Figure 13, a tooth 76 is on center, and the side teeth 75 and 77 are equally spaced at opposite sides of the center. In Figures 15 and 16, where only two teeth appear, they are equally spaced at opposite sides of the center. Thus, as the chain digs, the stress is equalized at opposite sides of the center line of the chain and there is a minimum tendency to twist or deform the chain in relation to its normal path of movement.

The present excavating elements should be considered in connection with the particular function which they perform. They are employable with a cribbing machine, the function of which is to remove ballast from between the ties of a track, from the so-called cribs, or spaces between the ties. The cribbing machine functions without the removal of the rails from the ties and, as shown in Figure 1, includes a chain carrying boom which may be inserted, between the ties, and below the rails. The cribbing machine may be used either to remove ballast permanently, the removed ballast being wasted, and replaced by new ballast, or it may be used to remove ballast to be cleaned and thereafter returned. In either event, the adequate removal of the ballast is but one factor of the successful operation. Especially where the ballast is to be removed and then returned after screening and cleaning, and, when there is no substantial rebuilding of the track and the track supporting mass, there should be a minimum disturbance of that part of the ballast which is not removed. Figure 10 illustrates diagrammatically the contour of the cut which is made by the excavating elements, in relation to the ballast which actually underlies the ties.

The ballast is usually packed very compactly with power tampers, around and under the ties. This packing extends inwardly from the tie ends to approximately one foot from the center of the tie. The center portion is loose. The packing which is secured by this tamping is further consolidated by the traffic over the rails, which tends still further to compact the ballast. Thus a very hard "bed" results directly under the ties. So far as possible, any cribbing out of the ballast should not disturb this bed. The tendency of ballast, under traffic and weather conditions, is to reduce the size of the individual pieces. A powder, mixed with mud and clay, often forms so-called cemented ballast. It is practically impossible to break up this cemented ballast, except with sharp pointed tools forced into it with great force. In order to break up this cemented ballast, I provide the pointed tools shown, for example, in Figures 13 to 16, inclusive. By alternating sharp pointed flights with the broad surfaced flights of Figure 10, I secure a breaking action with which is associated a simultaneous conveying or removing action.

In each crib section or space there is a combination of ballast materials, bounded by the wooden faces of the ties, and often bonded to the tie surface. It is important to remove the mud, dirt and debris that clings to the tie without damaging the tie itself. I obtain this result by employing excavating elements having end cutting surfaces or edges. As will be clear, for example, from Figures 10 and 12, I form a rather blunt and backwardly raked scraping edge at 100. This edge, as will be clear from Figure 10 or Figure 13, is located above the cutting level of the downwardly extending tools or points 75, 76 and 77 of Figure 13. Thus, while the downwardly extending tool portions penetrate below the level of the tie bottoms, as shown at X in Figure 17, the end edges 100 are positioned to operate against the cemented ballast along the lower part of the side faces of the ties. The preferred contour, which is obtained by oscillating the conveyor chain backwardly and forwardly along the track, while the chain is performing its excavating function, includes shallow, horizontal ledges 101, adjacent the ties, a downwardly and inwardly inclined slope 102, and a generally flat bottom 103. These shelves or ledges 101 may be approximately an inch wide, to give an example, and the downward slopes 102 may approximate 45°. The floor or bottom 103 should be several inches below the tie bottoms to provide for drainage.

The shape of the excavating elements should also be considered in relation to the removal of the material. Referring to Figure 1, as the conveyor elements pass about the idler 9, they encounter ballast that must be loosened up and dragged out. All of the excavating members have a forward rake or inclination. This inclination is provided so that the outer point of each digging element encounters the ballast first, so that a digging instead of a slapping action results. Thus the forward edge 62 of the broad member 61, and the corresponding edge of each of the other excavating elements actually enters the ballast with a true digging action. As the excavating elements pass along and under the lower side of the boom, the angle of inclination thus provided serves to maintain a simultaneous lifting and dragging action. This will be clear from an inspection of the lower part of Figure 1. The inclination of the excavating elements necessarily has a lifting action on the ballast particles. As the excavating elements pass to the upwardly and outwardly inclined end portion of the boom, the angle of the inclination is such that an upwardly and outwardly discharging action takes place. The particles are actually upwardly lifted or propelled, in addition to the outward movement, and the material is, in practice, thrown clear and deposited along the right of way or in the inter-track space of a multiple track line. The present elements have been designed to perform satisfactorily all of the above three functions, namely, the initial digging action, the combined lifting and lateral conveying action, and the final upward and outward discharging action.

In connection with a double chain structure for cribbers, I thus provide a highly efficient flight which connects two parallel chain components, and which also serves as a link part of each of the components. I illustrate various conformations and arrangements of digging elements on these flights. I find it advantageous to space the flights closely along the chain components, as shown, for example, in Figure 1. I also find it advantageous to arrange the excavating projections in a balanced or symmetrical arrangement at opposite sides of the central line of the entire chain element. As shown, for example, in Figures 10 to 16, the shovel 61 is centered on the O line. In Figure 13 a tooth or pick 76 is on center, and the side picks 75 and 77 are equally spaced at opposite sides of center. In Figures 15 and 16, where only two picks appear, they are equally spaced at opposite sides of the center line. All forms of the flight have in common that they are interchangeable with link elements and may be inserted in the two chain components.

I claim:

1. In a chain assembly, a chain guide having flanges extending outwardly therefrom in opposite directions, an endless chain and means for driving it, said chain including parallel, laterally spaced strands adapted each to engage and ride along one of said flanges, and spacing and connecting elements extending between said strands and spanning said guide, said connecting elements including tool portions outwardly extending from the chain.

2. In a chain assembly, a chain guide having outwardly opening convex and concave curvilinear guiding surfaces at opposite sides, an endless chain adapted to pass along said surfaces, and means for driving said chain, said chain including a plurality of parallel, transversely extending pins and link elements pivotally connecting said pins, each said link element having enlarged end portions connected by a narrowed waist portion, said end portions having parallel flattened surfaces, the flattened surfaces of the end portions of each link element lying generally in a single plane, said chain including a pair of laterally spaced strands having inwardly extending guide portions movable between said curvilinear guiding surfaces, and tool elements, outwardly extending from said chain connecting said strands and spanning said chain guide, each said tool element having at each end link portions apertured to permit the passage of said pins therethrough, whereby said tool elements are articulated with said chain.

3. In a chain assembly, an elongated chain guide curved intermediate its ends, an endless chain and means for driving it, a portion of said guide having a pair of flanges extending outwardly therefrom in opposite directions in a plane disposed inwardly of the adjacent outer edge of said guide, to receive and support one surface of the chain, said guide also having another pair of flanges extending outwardly therefrom in opposite directions adjacent the edge of said guide in spaced relation from the first-named flanges to partially overlie said chain and to engage the opposite surface of the chain, said last-named flanges extending about the curved portion of said chain guide to constrain the chain to movement about a reverse curve, the chain including separate and parallel strands and connecting elements extending between said strands and spanning the outer edges of said guide.

4. In an excavator chain a plurality of parallel chain components, each such component including pairs of spaced side link members having pintle receiving apertures therein and connecting pintles therefor, and unitary flights connecting said chain components, each said flight including a metal body portion and two spaced pairs of integral spaced lugs projecting from said body portion and shaped substantially like the side link members and interchangeable therewith in assembling the chain, said lugs having pintle receiving apertures adapted to receive the pintles received by said side link members, the apertures in said lugs being spaced from said body portion a distance less than the distance between the apertures, the apertures in said side link members being spaced from one edge thereof a distance equal to the distance between said lug apertures and said body portion, and one or more digging elements extending from said flights in a direction opposite to the direction of projection of the lugs from the body portion.

5. In an exacavator chain, a plurality of parallel chain components, each such component including pairs of spaced side link members and connecting pintles therefor, and flights connecting said chain components each said flight including two spaced pairs of spaced lugs shaped substantially like the side link members and interchangeable with any transverse set thereof in assembling the chain, each said flight including a transversely extending body portion, said lugs extending from the upper face of said body portion, one or more digging elements extending downwardly from the lower face of said body portion, the ends of said body portion being formed and adapted to act as cutting members having work-contacting edges located below said lugs and above said digging elements and exterior to the outermost of each pair of lugs and the outermost of each pair of side link members.

HARRY W. PROTZELLER.

REFERENCES CITED

The following references are of record in the file of this patent:

UNITED STATES PATENTS

| Number | Name | Date |
|---|---|---|
| 1,268,663 | Alvey | June 4, 1918 |
| 1,422,151 | Walker | July 11, 1922 |
| 1,558,550 | Joy | Oct. 27, 1925 |
| 1,708,132 | Haiss | Apr. 9, 1929 |
| 1,728,445 | Reynold et al. | Sept. 17, 1929 |
| 1,745,090 | Geithle | Jan. 28, 1930 |
| 2,128,345 | Briggs | Aug. 30, 1938 |
| 2,212,907 | Weiss | Aug. 27, 1940 |
| 2,274,970 | Tiffany | Mar. 3, 1942 |
| 2,400,502 | Hapman | May 21, 1946 |

FOREIGN PATENTS

| Number | Country | Date |
|---|---|---|
| 15,731 of 1896 | Great Britain | July 16, 1896 |
| 5,373 of 1902 | Great Britain | Mar. 4, 1902 |